Figure 1:
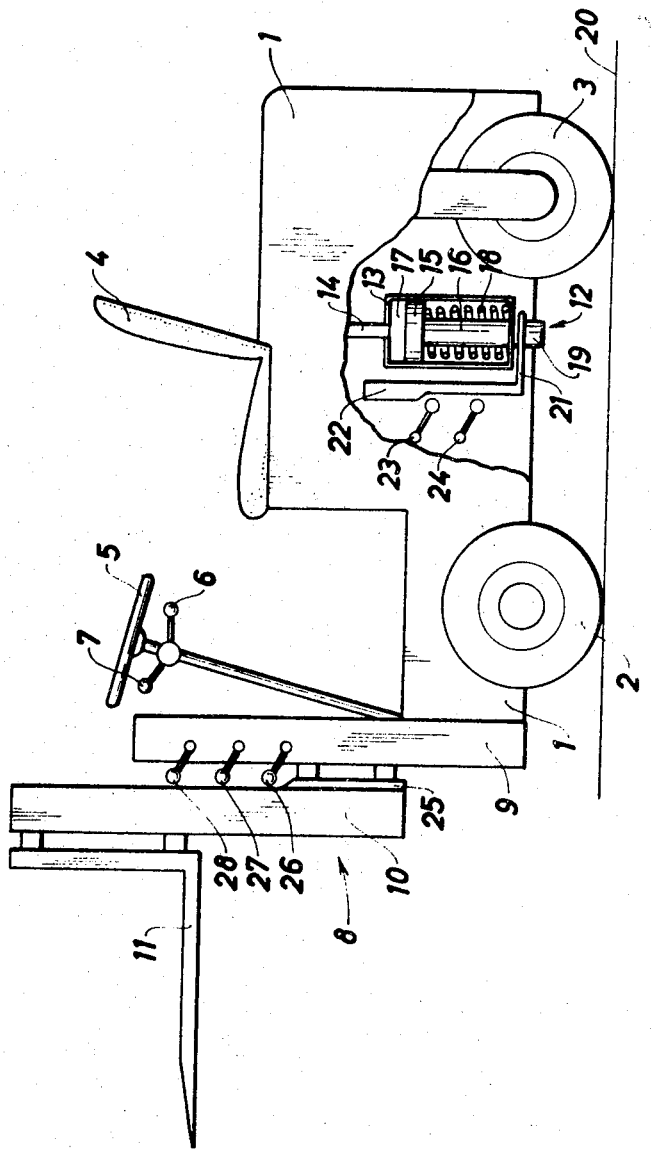

United States Patent

[11] 3,630,317

| [72] | Inventor | Knut Folke Jacobsson<br>Kulorgatan 49, 421 65, Vastra Frolunda, Sweden |
|---|---|---|
| [21] | Appl. No. | 869,208 |
| [22] | Filed | Oct. 24, 1969 |
| [45] | Patented | Dec. 28, 1971 |
| [32] | Priority | Oct. 16, 1968 |
| [33] | | Sweden |
| [31] | | 13924/68 |

[54] ARRANGEMENT FOR STABILIZATION OF TRUCKS
5 Claims, 3 Drawing Figs.

[52] U.S. Cl...................................................... 187/9,
 187/94, 214/142, 214/672, 280/150.5
[51] Int. Cl............................................................. B66b 9/20
[50] Field of Search............................................. 187/9, 94;
 214/142, 672, 673, 762; 280/150 C, 150.5

[56] References Cited
UNITED STATES PATENTS

| 2,763,385 | 9/1956 | Harrison...................... | 214/142 |
| 3,107,750 | 10/1963 | Bishop.......................... | 187/9 |
| 3,497,095 | 2/1970 | Couberly...................... | 214/142 |

FOREIGN PATENTS

| 751,269 | 6/1956 | Great Britain................ | 214/672 |

Primary Examiner—Harvey C. Hornsby
Attorney—Linton & Linton

ABSTRACT: A truck equipped with lifting means at the front end thereof, has means for stabilizing the horizontal position of the truck and means controlled by the movement of said lifting means for activating or deactivating said stabilizing means.

3,630,317

ARRANGEMENT FOR STABILIZATION OF TRUCKS

The present invention relates to an arrangement for stabilization of trucks of the so called front-loading-type, equipped with lifting means for movement in substantially vertical direction located at one end of the truck which is arranged to support and/or counter balance the intended load in such a way that the equilibrium of the truck is not changed, when the load is raised, and which is equipped with stabilizing means actuated by means of power organs.

In trucks, which are equipped with hoisting means for the load and which generally move on horizontal level, the stability of the truck, i.e. its properties of safety against overtilting, depend on the height position and weight of the load. The stability of the truck is especially influenced by said factors, when the trucks are of the type, where the load is carried by lifting means positioned outside of the supporting wheels, which is the case in fork trucks. In the cases where tilting over of the truck can be feared at great lifting height and/or heavy load, stabilizing means are arranged on the truck, which means can be made to support against the ground. Said stabilizing may comprise descendable supports only, possibly provided with wheels, which often is the case in trucks, which in order to permit greater maneuverability have been made as three wheelers, or comprise pivoted supports, which can be pivoted outwards and thereby increase the plane of support of the truck.

However, because of the fact that said stabilizing means in the prior art have been made for manual control, the overtilting risk has not been entirely eliminated. An error in estimating the lifting height and/or the weight of the load or an oversight may lead to the stabilizing means not being engaged, and the subsequent tilting over of the truck.

It is an object of the present invention to provide an arrangement by means of which said risk factor is eliminated by an automatization of the application of the stabilizing organs. Hereby the truck driver is relieved of this step, and there does not exist any risk due to forgetfulness or oversight.

Said purpose is achieved by a device which is characterized by it being arranged to provide the actuation of the stabilizing means, when the lifting means reaches a certain height position.

Figure 2:
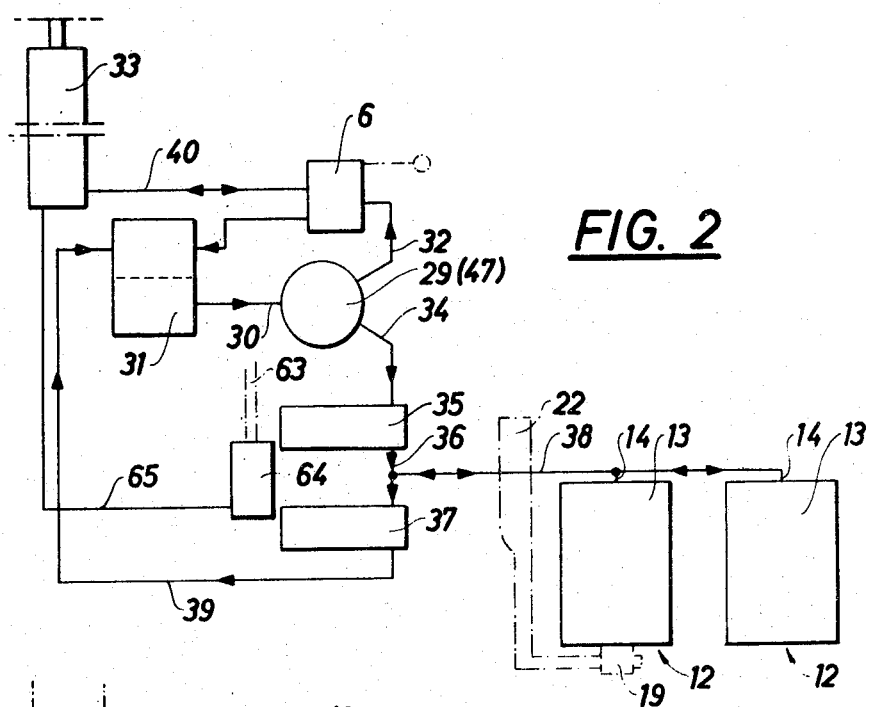
Figure 3:
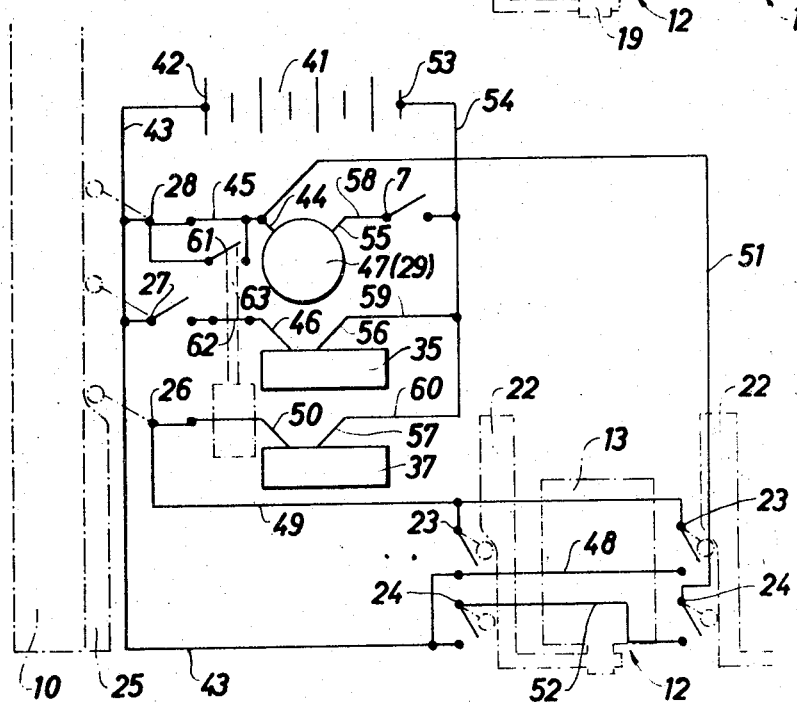

A suitable embodiment of the invention will now be described with reference to the accompanying drawings, in which:

FIG. 1 is a (schematic view of) a truck equipped with the arrangement for automatic stabilization, FIG. 2 is a diagram of connections for the electric functions of the arrangement, and FIG. 3 is a diagram of connections for its hydraulic functions.

According to FIG. 1 the truck comprises a chassis 1 provided with two front wheels 2, a steerable rear wheel 3, and a driver's seat 4. The truck controls comprise a steering wheel 5, a hoist control 6, a control switch 7, and a number of controls, not shown, for driving and possible other functions. At the front end of the truck there is a hoisting device 8 comprising a hoisting guide 9 fixed to the chassis 1 of the truck, a hydraulically displaceable lifting frame 10, and a lifting fork 11 displaceably arranged on the lifting frame 10.

On both sides of the rear portion of the chassis 1 there is a stabilizing device 12 comprising a hydraulic cylinder 13 with an input 14 for the pressure liquid, and a piston 15 with piston rod 16 displaceably mounted in the cylinder. The chamber 17 for the pressure liquid of the cylinder is above the piston 15, and the piston tends to occupy its upper position by the force from spring 18. The lower end 19 of the piston 16 is in contact with the ground level 20, when the piston 16 occupies its lowest position. An actuating organ 21 is fixed to the piston rods 16, said organ by means of a cam 22 actuating upon two contact switches 23 and 24, when the piston rod 16 performs a sliding movement. The hydraulic cylinder 13 as well as the contact switches 23, 24 are fixed to the chassis 1. The lifting guide 10 is also provided with a cam 25, which is arranged to actuate upon three electric contact switches 26, 27 and 28 during the lifting movement, said switches being fixed to the lifting guide connected with the chassis 1.

The necessary hydraulic organs for the lifting and stabilizing functions of the truck appear in the diagram of hydraulic connections according to FIG. 2. In said diagram 29 indicates an electrically driven hydraulic pump with its suction pipe 30 connected with a tank 31 for the hydraulic liquid. Two pressure pipes lead from the pump 29, one of which indicated with 32 communicating with the control arrangement 6 for the lifting movement, from where the liquid arriving from the pump continues to a lifting cylinder 33, which in conventional manner is connected with a tank 31 for the hydraulic liquid. Two pressure pipes lead from the pump 29, one of which indicated with 32 communicating with the control arrangement 6 for the lifting movement, from where the liquid arriving from the pump continues to a lifting cylinder 33, which in conventional manner is connected with the lifting arrangements 8. The other pressure pipe 34 from the pump leads through a first magnetic valve 35 and through a conduit 36 to a second magnetic valve 37. From the conduit 36 to a branch conduit 38 leads to the stabilizing devices 12. From the magnetic valve 37 and the control organ 6 return pipings lead to the tank 31 for hydraulic liquid.

The electric arrangements for the corresponding functions appear in the circuit diagram in FIG. 3. The digit 41 indicates an electric battery, which suitably in a manner not illustrated is connected with the driving motors of the truck. From one terminal 42 of the battery leads an additional cable 43, which via a cable 45 with the contact arrangement 28 connected to one of the terminals 44 of the motor 47 of the pump 28. The cable 43 is further by means of a cable 46 via the contact arrangement 27 connected to the magnetic valve 35. The magnetic valve 37 can further be connected to the circuit 43 via cables 48, 49, 50 and via the contact arrangements 26 and 23. In addition the terminal 44 of the pump motor 47 can be parallel with the circuit 45 and the contact arrangement 28 be connected to the circuit 43 by means of the switch arrangements 23 and the cables 51 and 52 (respectively).

The other terminal 53 of the battery the remaining connection terminals 55, 56 and 57 of the pump motor and the two magnetic valves are connected via the cables (circuits) 58, 59 and 60 respectively. In the circuit 58, which leads to the pump motor 47, the hand operated switch arrangement 7 is arranged.

The pump 29 is arranged to the effect that when the pump motor 47 is connected to the battery it delivers pressure liquid to the pipes 32 and 34. The magnetic valves 35 and 37 are arranged to open and let through hydraulic fluid when they are connected to the battery, they otherwise being closed. The switch arrangements 26 and 28 are arranged to keep the electric circuit closed in the cables 45 and 50 respectively, when they are not actuated by the cam 25 on the lifting frame 10. The switch arrangements 23 are connected in parallel and arranged to interrupt the current between the circuits 48 and 49, when both the stabilizing pistons 16 are in their upper position. The switch arrangements 24 are connected in series and arranged to close the circuit between the lines 43 and 51, when both the stabilizing pistons 16 are in their lowest position in contact with the ground or floor 20.

The arrangement described functions as follows: During the lifting cycle the operating switch 7 shall be closed while the other electric controls are in the positions shown in FIG. 3, as long as the travel path of the lifting movement has not passed over and above the height level illustrated in FIG. 1. Thus, the pump motor 47 works because of the switch arrangement 28 being closed, while on the other side no current is fed to the magnetic valves 35 and 37 because of the switch arrangement 27 and 23 being open. If the lifting movement continues further, which occurs by supplying pressure fluid through the pipes 32, 40 via the control valve 6 to the lifting cylinder 33, the cam 25 will be brought in contact with the switch arrangement 26 by the lifting slide bar 10. However, this does not mean any change, as the current to the magnetic valve 37 is already interrupted by the switch arrangements 23 and the valve is closed. During the continued lifting movement the switch arrangement 27 will be actuated by the cam 25, whereby the current through the line 46 is closed, so that the magnetic valve 35 opens up. Pressure fluid can now flow from the pump 29 through the pipe 34, the magnetic valve 35 and the pipe 38 to the stabilizing devices 12. Against the force of the springs 18 the pistons 15 are displaced downwards, whereby the cams 22 first bring the switch arrangements 23 and thereafter the switch arrangements 24 to a closed position, and finally the lower ends of the piston rods are brought in contact with the ground or floor 20.

The truck is now stabilized, and when the lifting movement continues, the contact arrangement 28 will be actuated by the cam 25. Thereby the current through the circuit 45 is interrupted, which circuit is connected to the pump motor 47. However, the pump motor 47 continues receiving current via the circuit 43, 52 and 51 provided that the stabilizing organs have reached their end positions, so that the switch arrangements 24 are closed. If this should not be the case, the stability of the truck is jeopardized and the lifting movement cannot continue, which is also prevented by the pump motor 47 coming to a halt due to the switch arrangement 28 as well as at least one of the contact arrangements 24 being in an opened position, so that pressure fluid no longer is fed to the cylinder 33.

However, if the stabilizing devices 12 at this moment have reached their working positions, which normally is the case, then the pump motor continues working due to it being fed with current via the circuits 43, 42 and 56, and the contact arrangements 24, and it can thus supply the necessary pressure fluid to the cylinder 33 for continued lifting movement.

During the lowering movement of the lifting arrangement 8 the cam 25 will first get released from engagement with the contact arrangement 28, whereby said arrangement again is closed. Thereafter the cam is released from engagement with the contact arrangement 27, and the current through the circuit 46 is interrupted. This leads to the closing of the magnetic valve 35, so that any pressure fluid is no longer fed to the stabilizing organs 12. However, as the magnetic valve 37 is still closed, the pistons 15 are maintained in their lowest positions. When during the continued descending movement also the switch arrangement 26 is released from engagement, then the current to the magnetic valve 37 is closed and said valve opens up, whereby the pressure cylinders 13 of the stabilizing organs 12 are relieved via the pipes 38 and 39. Under force of the springs 18 the pistons 15 are now pressed upwards, while the pressure fluid is returned to the tank 31.

During this movement the switch arrangements 24 are first opened, which, however, does not affect the operation due to the fact that the switch arrangement 28 at this moment is closed. When both the pistons 15 with the piston rods 16 and the cams 22 have occupied the upper end position, the current to the magnetic valve 37 is interrupted by means of the contact arrangements 23, and said valve is closed. Thereby all the organs, except the manually operated contact arrangement 7 valve, have occupied their starting positions according to FIG. 3.

By the two switch arrangements 61 and 62, which are arranged in parallel and in series respectively with the switch arrangements 28 and 27, the automatic stabilizing arrangement can be disengaged. This occurs by means of the bar 63, which is in connection with said switches 61 and 62, changing contact position from the position showed in FIG. 3 to a closed position for the contact arrangement 61 and an open position for 62. Hereby the pump motor 47 will not stop, and the valve 35 will not open up, irrespective of the contact arrangements 24, 27 and 28 being in position therefor or not. The bar 63 can be arranged for manual operation. It can also be automatically operated by a pressure-sensitive organ 64, see FIG. 2, for example a spring-forced piston, which brings the bar 63 to the position illustrated in FIG. 3 with the stabilizing arrangement connected only when a certain weight of the load represented by a certain hydraulic pressure in the lifting cylinder 33, whereto the pressure-sensitive organ 64 is connected via the circuit 65, is exceeded. Hereby it is obtained that the stabilizing organs are not engaged during the handling operations of light loads, which do not imperil the stability of the truck.

By the arrangement described above an automatic stabilization of the truck as well as the prevention of continued lifting is obtained, if the stabilizing organs should be in contact with the ground or floor. By the arrangement comprising several trigger organs, represented by the switch arrangements 26, 27 and 28, one located above the other it is achieved that the stabilizing organs begin getting actuated before the height limit position, for instability represented by the switch arrangement 28 is reached, whereby the advantage is gained that the lifting arrangement does not have to stop in order to await the engagement of the stabilizing organs. In addition a further advantage is obtained, viz the stabilizing organs 12 not being moved up and down during very moderate movements of the lifting arrangement around the sensitive position.

The arrangement described above is chosen by way of example only and can be modified within the scope of the following claims.

I claim:

1. System for the stabilization of trucks of the front end-loading type, equipped with lifting means on a chassis for movement in a substantially vertical direction and located at said front end of the truck, which is arranged to support and/or counterbalance the load in such a way that the equilibrium of the truck is not changed, when the load is raised, comprising truck-stabilizing means mounted on said truck, power means for operating said stabilizing means, a first control device mounted on said truck and connected to said power means and capable of activating the same to bring the stabilizing means into its activated position when the lifting means under an upwards movement have reached a predetermined first level relative to the chassis and a second control device mounted on said truck and connected to said power means and capable of activating the same to bring the stabilizing means into a deactivated position when the lifting means under a downwards movement have reached a predetermined second level wherein the activation of said first and second control devices in response to the vertical position of the lifting means automatically control the activation of said power means, said two levels are positioned at a given distance relative to each other with the second level being below the first level.

2. System according to claim 1, including a third control device mounted on said truck and connected to said lifting means and to said stabilizing means and capable of preventing said lifting means from moving in an upwards direction when they have reached a predetermined third level relative the chassis when said stabilizing means are indicated to be in an unactivated position and said third level is positioned above said first level.

3. System according to claim 1, wherein each of said control devices comprise an electrical switch, a cam for operating said switches when said lifting means have reached their respective predetermined levels, an electrically controlled valve connected to said switches, a pressure pump for supply fluid to said power means and said valve controlling the flow of said fluid whereby said first control device will force the same to activate the stabilizing means and said second control device will deactivate the stabilizing means.

4. System according to claim 2, wherein each of said control devices comprise an electrical switch, a cam for actuating said control device when said lifting means have reached the respective predetermined levels, an electrically controlled valve connected to said switch, a pressure pump for supplying fluid to said power means and said valve controlling the flow of fluid whereby said first control device will force the same to activate said stabilizing means, said second control device will deactivate said stabilizing means and said third control device will control the flow of fluid to said lifting means.

5. System according to claim 4, including a hydraulic system comprising a pump for said fluid, and electric motor for driving said pump, a conduit leading from the pressure side of said pump, a first valve in said conduit, tended for the supply of current to the first electrically controlled valve and further arranged to maintain open the circuit intended for the supply of current to said motor only when a certain weight of the load is exceeded, irrespective of the position of the switch arrangements actuated by said lifting means and said stabilizing means.

* * * * *